(12) United States Patent
Slusher

(10) Patent No.: US 6,285,753 B1
(45) Date of Patent: Sep. 4, 2001

(54) SYSTEM AND METHOD FOR LOCALLY INTELLIGENT AND ADAPTIVE DIALING OF TELEPHONE AND OTHER NETWORK ACCESS NUMBERS

(75) Inventor: Jeffrey Slusher, Redmond, WA (US)

(73) Assignee: Siemens Information and Communication Networks, Inc., Santa Clara, CA (US)

( * ) Notice: Subject to any disclaimer, the term of this patent is extended or adjusted under 35 U.S.C. 154(b) by 0 days.

(21) Appl. No.: 09/053,147

(22) Filed: Mar. 31, 1998

(51) Int. Cl.$^7$ .......................... H04M 1/00; H04M 11/00
(52) U.S. Cl. ................... 379/355; 379/354; 379/100.14
(58) Field of Search ............................... 379/352, 353, 379/354, 355, 356, 357, 359, 904, 100.14

(56) References Cited

U.S. PATENT DOCUMENTS

| | | | |
|---|---|---|---|
| 5,339,357 | * 8/1994 | Sawamura et al. | 379/355 |
| 5,592,546 | * 1/1997 | Takahashi | 379/357 |
| 5,677,950 | * 10/1997 | Brendzel | 379/355 |
| 5,946,390 | * 8/1999 | Boakes | 379/355 |
| 6,097,808 | * 8/2000 | Chang | 379/355 |

FOREIGN PATENT DOCUMENTS

| | | | |
|---|---|---|---|
| 0280859 | * 11/1990 | (JP) | 379/354 |
| 0034663 | * 2/1991 | (JP) | 379/354 |
| 0228452 | * 10/1991 | (JP) | 379/354 |

* cited by examiner

*Primary Examiner*—Fan Tsang
*Assistant Examiner*—Ovidio Escalante

(57) ABSTRACT

Errors in dialing or otherwise entering network access codes such as telephone numbers are identified by comparing each entered code with a set of stored codes. Each entered code is also stored. For each stored code, statistics are compiled that reflect the likelihood that the code is invalid. Such statistics include frequency of use over a given time period, the length of the connection to the network after each use, and the length of time after ending a short connection that a different but similar or more probably correct code is entered. Similarity between codes is preferably measured by determining in how many positions the codes agree. If an entered code has a statistically low likelihood of being correct, then the system replaces it with a code that is sufficiently similar, or immediately follows it sufficiently often. The system checks, for example, for possible likely transposition errors. By comparing on a position-by-position basis, the system may also suggest to the user the likely complete code before it is completely entered, thus providing a "quick-dial" feature for frequently dialed numbers without needing dedicated keys. The system is locally intelligent in that it does not need to rely on any signals from the network to identify dialing errors.

15 Claims, 1 Drawing Sheet

US 6,285,753 B1

SYSTEM AND METHOD FOR LOCALLY INTELLIGENT AND ADAPTIVE DIALING OF TELEPHONE AND OTHER NETWORK ACCESS NUMBERS

BACKGROUND OF THE INVENTION

1. Field of the Invention

This invention relates to a system and method for automatically identifying and dialing complete and correct codes for accessing networks, such as telephone numbers.

2. Description of the Related Art

Telephones are everywhere. Walk through a modem workplace and the musically welling tintinnabulation you hear will almost surely not be foretelling a world of merriment, as in Edgar Allan Poe's poem, but rather will be proclaiming a world of telephones.

Not long ago, technological optimists prophesied that modern telecommunications equipment such as cellular phones, fax machines and modems would help modern workers accomplish much more much faster, opening the way for shorter work weeks with undiminished productivity. What has happened, of course, is best summarized by the famous Parkinson Principle, which states that work expands to fill the time allotted for its completion. Experience has now borne out a corollary: The need for telephone numbers expands to use up all the available digits.

As numbers proliferate, so do dialing errors, and despite the best efforts of telephone designers, dialing errors continue to be a problem. One might misdial a number for any of several reasons, such as a memory lapse, accidentally pushing a button adjacent to the correct one, or not knowing or remembering the correct sequence of prefixes before the actual number. Misdialings are particularly irksome for the cell phone user on the move (who should in any event spend more time watching traffic and less time dialing numbers) and for those who make many calls in the course of a day.

Making things worse, out-of-zone phone numbers are becoming longer, even those within the same area code. In some areas, for example, the 425 area code region east of Seattle, one must now know whether the number one wants to call requires only the seven-digit subscriber number such as 123-4567, the subscriber number plus area code, that is, 425-123-4567, or the subscriber number, the area code, and a prefixed "1", that is, 1-425-123-4567. Failure to guess correctly gets one an error message saying that it is necessary to dial (or not dial) the area code and/or the prefixed "1" along with the number. Irritatingly, there are separate error messages for wrongly including (or excluding) the area code and the "1". As such, if one is dialing an unfamiliar number even within one's own area code but doesn't happen to know what prefixes are needed relative to one's own exchange, then it is possible—indeed, probable—that one will get at least one error message and requirement to re-dial.

As the need for telephone numbers increases, more and more area codes are being sub-divided. Once again, the Puget Sound area serves as an example. In 1997, the previous 206 area code became, like Caesar's Gaul, divided into three parts: 206, 425 and 253. When dialing to several cities (exchanges) near the new area code boundaries, it is often a matter of chance whether one will dial the correct area code. As is pointed out above, though, even guessing the correct area code may not be enough for success, since one must also correctly guess whether a "1" prefix is required or not.

This problem also creeps up when dialing international calls. The structure of such a number is, in most cases: (INTL ACCESS CODE)+(COUNTRY CODE)+(DOMESTIC EXCHANGE)+(SUBSCRIBER NUMBER). What many callers do not realize is that one must usually (but not always) delete some prefixed digit (typically, but not always, "0") from the beginning of the listed DOMESTIC EXCHANGE in order for the call to go through. Dialing an incorrect country code or failing to delete the prefixed digit thus creates problems identical to those encountered when one doesn't know the proper area code or whether the prefixed "1" is necessary. (Note that the "1" is the prefixed digit used in the USA instead of the internationally more common "0".) What is needed is a telephone that would either "know" or, preferably, "learn" what dialing patterns are errors and automatically correct these before submitting the number to the exchange.

It is especially easy to misdial a number when dialing quickly or when distracted. Most such errors are in only one digit, or at most two. It should not be necessary to have to redial to correct "obvious" errors in frequently dialed numbers. One's telephone or other dialing system (such as a computer-based dialing program) should be able to recognize and correct such errors. Note that failure to include or exclude one or more prefixes is a special case of a misdialed number.

Many phones have dedicated "speed-dial" buttons for frequently called numbers. Others use existing keys in combination (such as *1 through *9) to cause the phone to recall stored abbreviations for longer numbers. Some phones have both capabilities. One problem with this approach is that the number of possible buttons or abbreviations is usually small. Allowing for a large number of abbreviations, however, would create a different problem—one must then remember or have labels for all of the abbreviations. The problem is worst for cell phones, which don't allow more than about ten pre-stored abbreviated numbers, don't have room for many labels, and require the user to look away from the road to do any dialing at all. What is needed is a phone that actually reduces the time required to dial numbers and that recognizes a large number of "quick-dial" numbers without the need for dedicated keys.

In an attempt to address some of these problems, some systems have been proposed in which the phone system recognizes network-generated voice error messages such as the maddening: "We're sorry, you must first dial a '1' before dialing this number." Systems such as these suffer from several drawbacks, however: They rely on speech recognition, which won't work in all cases, in particular, if the error message is in a foreign language or changes; they may not be able to distinguish what type of error is indicated; and they do nothing to solve the other problems mentioned above, such as recognizing non-system errors such as a misdialed digit in a frequently dialed phone number.

At the heart of these shortcomings is the reliance on the "intelligence" of the system being in the remote exchange—the network exchange senses that a number has been misdialed, and issues an error message, but it usually does nothing to help the user. When it comes to sub-divided area codes, the system may put through a call dialed with the "old" area code for a time, thus performing simple error correction, but this service usually ceases after at most a few months. Of course, such "remotely intelligent" systems take no account of the dialing patterns of any particular subscriber; rather, they slavishly put through a call for even incorrectly dialed numbers as long as they sense the correct prefixes and any valid telephone number within the dialed area.

SUMMARY OF THE INVENTION

This invention solves the problems mentioned above by providing a system and method for detection and, in most cases, correction of misdialed telephone or other network access numbers. The dialing errors may be "obvious" or systematic errors such as erroneously deleted or included prefixes, or "occasional," such as an accidentally misdialed digit. At the same time, the invention reduces the problems arising from the frequent need to dial entire, sometimes long, numbers even when one's calling history makes clear that fewer digits completely determine which number is intended.

The invention provides a method and a system for generating and submitting access codes such as telephone numbers to a network such as a public telephone network. According to the invention, a plurality of stored codes (such as telephone numbers) and a corresponding plurality of sets of code access statistics are compiled and stored in a memory. A user enters an initial access code, for example, using the keypad of a telephone or the "virtual" keypad of a software-based dialing routine.

A processor senses entry of this initial access code and then compares it with the plurality of stored codes. The processor then calculates an error likelihood measure (or, equivalently, a measure of the probability that the number is correct) as a predetermined function of the initial access code, the stored codes, and the corresponding sets of code access statistics. When the likelihood of error is less than the predetermined error threshold, however, the system assumes that the initial access code was correct and sets it to be a final access code. When the error likelihood measure is greater than or equal to a predetermined error threshold, the processor selects a most likely correct code from among the stored codes and sets the most likely correct code to be the final access code. The system then accesses and connects (for example, "dials") to the network and submits to it the final access code to begin a transaction such as a telephone call or data transfer.

In the preferred embodiment of the invention, upon connecting to the network using the final access code, the system measures a total connection time from initial connection to conclusion of the connection by means of a hardware or software timer. The final access code is then also preferably stored as one of the stored access codes and the processor calculates and includes a predetermined function of the total connection time in the set of code access statistics corresponding to the final access code.

As part of compiling and storing the plurality of sets of code access statistics, the invention preferably also calculates and stores an average connection time for each stored access code. For each final access code dialed with an average connection time less than a predetermined minimum connection time, the processor, by means of the timer, then also determines a post-connection waiting time until a subsequent connection is initiated by the user using a subsequent access code. When this post-connection waiting time is less than a pre-determined minimum waiting period, the processor assumes the previous and subsequently accessed numbers are probably related (the one probably being a correction of the other) and includes the subsequent access code in the code access statistics corresponding to the final access code. In order to better identify dialing errors in only one or a few code positions, the invention may optionally include the subsequent access code in the code access statistics corresponding to the final access code only when the final and subsequent access codes differ by less than a predetermined similarity measure.

In the preferred embodiment of the invention, the initial access and stored codes correspond to positionally ordered sequences of alphanumeric characters. Calculating the error likelihood measure thereby includes the sub-step of determining a similarity measure between the initial and stored access codes through position-by-position comparison of the characters in the respective codes.

In order to implement a quick-dial facility, and also to minimize dialing errors especially in the context of mobile telephones, the processor preferably—but optionally—separately senses entry of each character of the initial access code. It then compares each sensed entered character of the initial access code with a positionally corresponding character of each stored access code. After sensing entry of a predetermined minimum number of characters of the initial access code, and after sensing each subsequently entered character of the initial access code, the processor then designates as a most likely complete access code the stored access code having a highest similarity measure relative to the sensed entered characters of the initial access code. This most likely code is displayed to the user, and the processor then sets the final access code equal to the most likely complete access code when the user indicates acceptance through some action such as pressing a dedicated key, or simply by not pressing any more keys for a predetermined number of seconds.

The measure of error likelihood is preferably stored for each stored code and is included among the respective sets of code access statistics. The error likelihood measure for each stored access code optionally includes a frequency parameter corresponding to the number of times per predetermined time unit each stored code access sequence has been entered as the initial access code. When the system according to the invention connects to the network using the final access code, it preferably measures a total connection time from initial connection to conclusion of the connection. The processor then calculates and includes in the error likelihood measure for each stored access code an average connection time corresponding to an average of the total connection times measured when the respective stored access code has been submitted as the final access code. The more frequently, or longer, or both, a particular code is entered and used for a connection, the more likely it is to be correct.

In an embodiment of the invention particularly well suited to identifying and correcting transposed dialed digits, while recognizing the possibility that two similar (differing only by a single transposition) numbers may in fact both be valid, the processor first identifies whether the initial access code is also a stored access code. If so, it identifies as a potential transposed code any stored access code that differs from the initial access code only by an adjacent pair of characters being transposed relative to a positionally identical pair of characters of the initial access code. The processor then compares the error likelihood measures of the potential transposed code and the initial access code. It then sets as the final access code the one of the potential transposed code and the initial access code that has the lowest error likelihood measure, but only when the error likelihood measures differ by more than a predetermined difference threshold.

DETAILED DESCRIPTION

Figure 1:
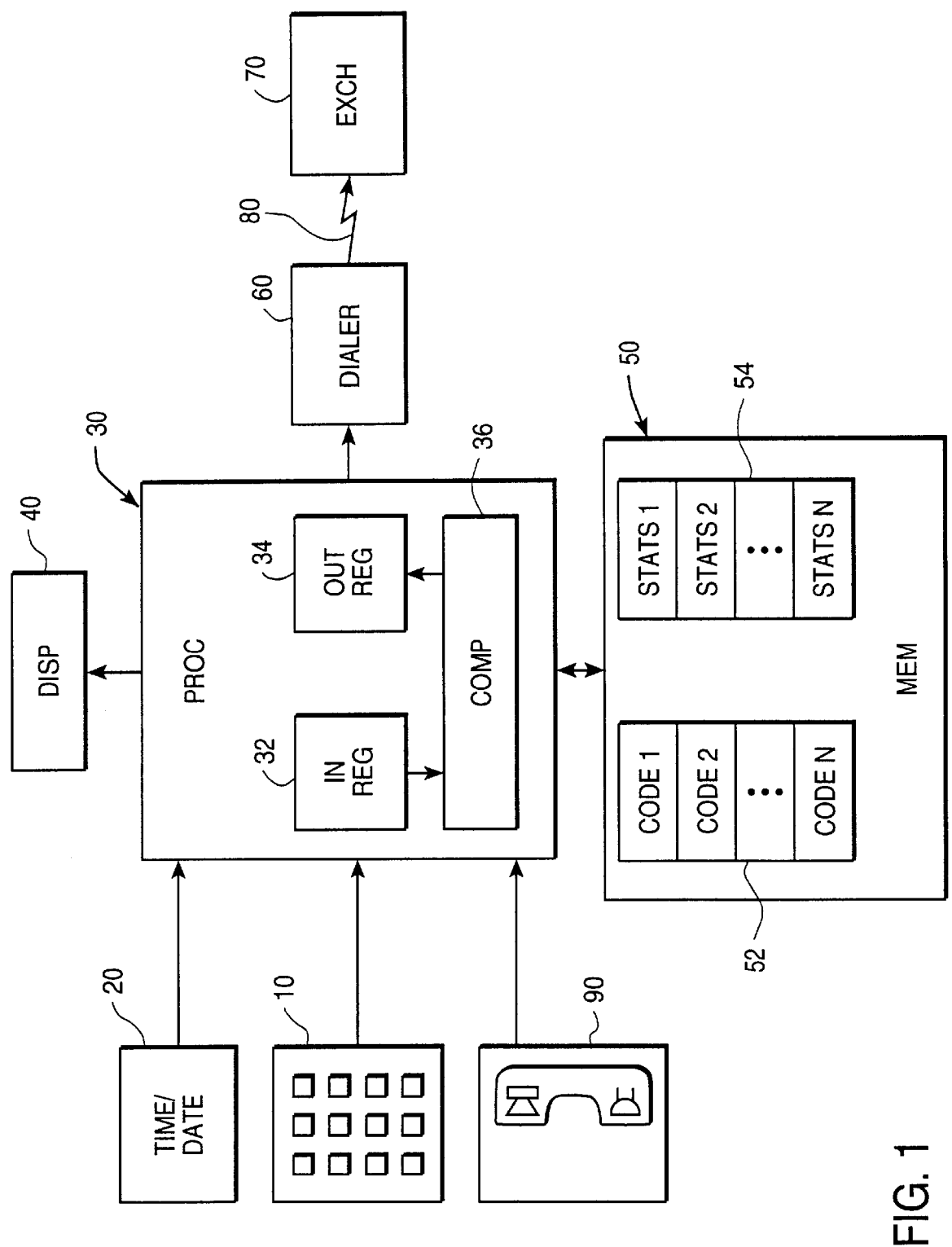
FIG. 1 illustrates the main components of the localized, intelligent dialing system according to the invention.

The invention is described below primarily with reference to solving various problems relating to dialing telephone numbers, since it is in this area that the invention will almost certainly be most useful and beneficial for now. As technology evolves, however, so too do the concepts "telephone," "dialing" and "number." Even now, for example, users may "dial" "telephone" "numbers" not with a keypad or dial, and not to reach a telephone, and not using any numbers at all; instead, users already may use a mouse, trackball, pointer, speech recognizer or other input device to select any sequence of alphanumeric or other characters in order to initiate connection with some other remote device, such as another computer. Furthermore, in many instances, such as when establishing a modem or telefax connection, a "call" has nothing to do with voice communication. Below, merely for the sake of simplicity, the term "call" refers to any attempted initiation of a network contact by generating, entering and submitting for routing some code sequence such as a telephone number. This invention is suitable for implementation in any such environment where a user frequently selects a sequence of digits or characters to contact some other subscriber or entity on a public or private network.

FIG. 1 illustrates the main components of the locally intelligent and adaptive number-dialing system according to the invention. These include a code (digit and/or character) input device 10 and a time/date device 20, both of which are connected to a processor 30; an optional display 40; a memory 50; and a network connection device such as a dialing unit 60 that is connected to a network exchange system 70 via any known transmission medium 80.

The digit and/or character input device 10 may be any conventional device such as a keypad or rotor, a keyboard, a voice-activated, speech-controlled dialing unit, pointers, or all or part of a conventional keyboard. It may also be "virtual" versions of any of these, such as an on-screen display of a keypad, whose numbers or characters the user selects by moving a mouse, touchpad, trackball, or other tracking device (including speech-controlled) to control some selection indicator such as a cursor. It could also be a device or system that generates numbers to be dialed. These might be found, for example, in systems used by telemarketers or others who frequently call (and, usually, disturb and irritate) many people "cold," that is, anonymously, whose telephone numbers are generated from lists, some of which may be out of date.

The keys or buttons—real or virtual—on the input device 10 will include whatever numeric, alphanumeric or other characters necessary to access the network and complete a call. Merely for the sake of simplicity, all such codes will be referred to below as "numbers," since the invention's foremost use is anticipated to be for dialing telephone numbers. Other local control keys may, of course, also be included. For example, a normal mobile phone keypad will have buttons for the digits 0–9 (which, in the USA, also are marked with letters of the alphabet), as well as for the symbols * and #, but will normally also include other non-network keys such the power on-off key, a "send" button, a key for clearing entered digits or numbers, and so on.

The time/date device 20 may be any conventional clock implemented in hard-or software. It may be a circuit separate from the processor; it may be the same clock used to time the processor itself; or it may be a section of the processor's software code calibrated to act as a timer and/or calendar. It may also be an externally obtained time and/or date signal, for example, taken from the network to which the invention is connected, from a computer (for example, the operating system) in which the invention is incorporated (for example, in the case of a "virtual" telephone dialing system). The units of time used in the invention will seldom, if ever, need to be shorter than seconds, and even 10-second time intervals may suffice.

In the preferred embodiment of the invention, the dates or, equivalently, the number of days since some call or between some calls, are also recorded. In these cases, a conventional hardware or software implementation of the time/date circuit 20 will similarly be chosen to provide this information. This is described further below.

The processor may also be of any conventional type, and will typically be the same one already found in the telephone (if sufficiently advanced) or computer in which the invention is to be implemented. For dialing systems lacking a programmable processor, any conventional processor may be included, along with conventional circuitry to manage and apply power, clock signals, program instructions, I/O control signals, and other standard signals. One advantage of the invention is that, in most cases, it can be implemented using either very little of the processing time and storage space of existing processors, or with added, dedicated processing circuitry of low cost and complexity. It is also possible to implement the processor 30 as an application-specific integrated circuit (ASIC) although this will, in most applications, be unnecessarily costly and complicated, especially in applications that already include a processor that carries out other tasks.

A display 40 is connected to the processor 30 for displaying the various different types of information described in greater detail below. The display may be an existing or dedicated physical display unit built into the telephone or other dialing device, along with any conventional driver needed between the processor and display. It may be a software-generated partial or full screen on the monitor of the user's computer, especially in the case of a "virtual" telephone. The display may also be audio, for example for blind users, in which case conventional speech synthesis circuitry will be included.

A memory 50 is connected to or incorporated within the processor 30. In cases where the system in which the invention is incorporated already has a memory, the memory 50 may be either a portion of the same memory if this is big enough, or an expansion of it. The invention builds up data bases of called numbers and statistics relating to the dialing history. Experience and conventional experiments will determine how large the data base will need to be for each class of users. Residential users may, for example, not call more than a few dozen different numbers with any frequency in a year, whereas a salesman might routinely call dozens of regular customers every day.

It is even possible for the memory 50 to be, or include, a portable device such as a floppy disk, which might allow one user to take her dialing history to different dialing systems and still be able to use the invention. For example, if the user is a salesman whose work station changes from day to day or week to week, then the data base and statistics compiled for him could be used and updated at whichever station he happens to be. In systems where many users use the invention and are all connected to a central system, then the memory 50 for each may simply be a portion of the larger system's memory.

For each user or group of users viewed as a collective, the memory includes a portion or data base 52 of dialed or stored numbers (or other codes) Code 1, Code 2, . . . , Code n, and a portion or data base 54 for dialing statistics Stats 1, Stats 2, . . . , Stats n, associated with the dialed or stored numbers. These data bases are discussed in greater detail below.

Once the system according to the invention determines (as described below) which number (or other code sequence) is to be dialed or otherwise submitted for routing, it passes the number to a conventional dialing circuit 60, which establishes contact with a conventional routing switch or exchange 70 via any conventional medium 80. In the case of a typical North American telephone, telefax or modem, the dialer will include the dial-tone or connection sensor, the dual-tone signal generator, and any other conventional signal conditioning circuitry; the exchange will be the local switching system; and the medium will be either a land-based cable or, in the case of a mobile telephone, a radio-frequency connection to the nearest system receiver(s).

The processor 30 includes (or is attached to) an input register 32 that holds or sequentially accumulates the numbers dialed or generated by the user via the input device 10, an output register 34 (or sequential output device) that holds or generates the number actually to be submitted for dialing to the network, and a comparison sub-system 36 (either specialized hardware, or, preferably, a software routine included in the processor's other programming) that analyzes and compares the dialed number with the data base 52 of previously stored numbers (described below) with respect to the information in the statistics data base 54.

The registers 32, 34 may be implemented as positions in the memory 50. The input register may also be the same as is used to store the "last dialed" number in many telephones, telefax machines, and software dialing packages that include a "redial" feature. The comparison unit 36 will typically be implemented as a section of the processor's operating program; in other words, the comparison unit 36 may be implemented in software, as long as the dialed number in the register 32 is made available for software comparison and analysis.

Whenever a user lifts the telephone handset, pushes a key or button (for example, for a speaker phone), clicks on a specific displayed icon, or activates some other conventional device 90 for requesting network access, the processor 30 begins the code analysis routine according to the invention. Actual connection with the network, for example, to get a dial tone, will occur either when the system according to the invention has completed its code analysis and correction, described below, or immediately, if the user has disabled the invention. Methods for connecting to a network are well known and are therefore not described further. For purposes of the invention, it is simply necessary that the processor 30 should receive some signal indicating that the user has begun a call, that is, that the dialing system is active, and also is able to sense when the user has completed the current call. This may be arranged in any conventional manner, and will typically be made possible simply by sensing the tone request and activation signals already included in the dialing system.

In the memory 50, the system stores previously dialed (or otherwise input) numbers as a list or data base 52. Along with each number, the system associates and stores in the data base 54 a set of dialing statistics. These statistics may, but need not, include, by way of example only, any or all of the following:

date and/or time of first dialing;
number of times dialed during a predetermined period before the current date or time, for example, in the last month or week, or since the first time dialed; this may also be an average, preferably time-weighted of the number of times dialed, in order to provide a measure of the average frequency of use;

average length of time the telephone or dialing system is "active" (connected to the network) after the number is dialed or submitted; the average may also be time-weighted by the "age" of each previous call; and for each stored number with an average active time less than an predetermined time (either pre-set or experimentally determined), links to other numbers in the data base dialed with at least a predetermined minimum frequency within a predetermined time (for example, fifteen seconds) after hanging up; the use of address pointers to create such linked lists is well understood and any known method may be used.

The stored numbers and their associated statistics may be ordered in the memory data bases 52, 54 in any conventional manner. The primary consideration should be ease of rapid searching for comparison with a dialed or partially dialed number. One advantageous ordering is simply ascending or descending numerical order. Another advantageous ordering is in increasing or decreasing order of calling frequency, possibly weighted by "age," so that a number that was dialed frequently only a long time ago (defined in any convenient sense) would be ranked lower than a number dialed less frequently but, on the average, more recently.

The main steps of operation followed according to the invention are as follows (particulars and alternatives are discussed below):

First, the user submits (for example, by dialing the telephone) a number for use in connecting to the network. The system then either waits until the complete number has been submitted and stored in the register 32, or analyzes it digit by digit (explained further below); in other words, the invention provides for either parallel or serial number analysis, or both. The system may recognize a complete number in any of several ways, which include: a pause greater than a predetermined number of seconds; user activation of a button such as the "send" button on a mobile phone or of a "dial" icon on a virtual keypad; or sensing that a certain maximum number of digits have already been entered for the dialing region. In the USA, for example, every dialed telephone number that starts with a "1" is a domestic call with eleven total digits.

The system according to the invention, in particular, the comparison sub-system 36, then compares the dialed number with the other numbers stored in the data base 52. If the number is in the data base and has an average call duration greater than a predetermined number of seconds (or other time units), then the number is submitted as is via the dialing circuit 60 to the network. If the number is not found in the data base 52, however, or if it is, but with an average call duration less than the predetermined time limit, then the processor 30 scans the stored numbers to find the stored number that is most similar to the dialed number while differing from it by less than a predefined amount. The number meeting these criteria is the assumed intended number. These concepts are discussed further below.

If serial processing is implemented, then the processor can search the data base 52 as each digit is received. In this case, the data base should preferably be organized in numerical order rather than by frequency. As each new digit is entered, it will further limit the search. Note that dialing errors early in the number may complicate such a search, so that, in general, it will be preferable to wait for a complete number to be entered and accumulated in the register 32 before doing the data base search. This may introduce a dialing delay, but in most cases this will be acceptable since all conventional microprocessors will be able to operate fast enough, and ultimately output the number to be dialed so fast, that any delay will be minimal.

On the other hand, serial number identification will improve the ability of the invention to quickly "predict" the number to be dialed and to suggest the complete number before it is fully dialed. This improves the "speed-dial" ability of the invention, by which it can replace or extend any existing features of the dialing system that allow the user to pre-store shortened versions of frequently dialed numbers. In this case, the processor should preferably wait until a predetermined number of digits have been entered, for example, until the fourth or fifth digit of a number in the USA, in order to get past area codes before suggesting complete numbers. This is processing is thus essentially partially serial and partially parallel. Whether serial and/or parallel number processing—full or partial—is implemented will thus depend on which features of the invention one finds most useful and desirable in any given application. It is also possible to implement both, with partial-number, serial digit processing to enable certain features of the invention and whole-number processing to enable others.

Once the processor has identified the assumed intended number, then it either automatically submits this assumed intended number for dialing, or it prompts the user to select either the number actually dialed or the assumed intended number. If, in a given application, both automatic and prompted submission are implemented, then some dedicated toggle or key sequence, either hardware or software, should be included in the system to signal the desired default action to the processor. Furthermore, the processor should preferably signal the user, either visually by means of the display 40, or audibly, or both, that it is changing the dialed number, even when automatically submitting the changed number. This will give the user a signal to end the call and turn the automatic correction feature off before trying the call again, for example, when the actually dialed number in fact was correct as dialed.

It is even possible to implement mixed defaults, depending on how certain it is (according to a predetermined probability measure) that the actually dialed number is incorrect. For example, every domestic call in the USA that starts with a "1" and has only ten total digits must be incomplete. If, for example, the number 1-425-885-4326 (hyphens added for clarity) is stored in the data base 52 with a calling frequency of ten times a day, and no other stored number is close, then it is very probable (although, of course, not certain) that a dialed number of 1-425-85-4326 is incorrect because the second "8" was deleted. The system could then automatically make this correction.

Once a number is selected for submission to the network, either because it was correct to start with or because it was corrected, and a connection has been established with another subscriber (busy signal processing is discussed below), the processor starts the timing device 20. When the call is completed (sensed in any conventional manner), then the processor stops the timing device 20 and either stores the dialed number if it is new to the data base 52, and calculates and stores its statistics, or it updates the statistics of the number if it has previously been entered in the data base 52.

If the just completed call lasted less than a predetermined minimum assumed correct call time (for example, 20 seconds), then the processor immediately restarts the timing device to begin a predetermined post-call waiting period. The proper post-call waiting period may be determined experimentally, for example, by tracking the dialing patterns of representative test subjects. If the user then dials yet another number within the post-call waiting period, then the processor stops the timing device, processes the newly dialed number as usual (including timing it), stores the newly dialed number, or updates its statistics if it has been stored previously. At the same time, the number, or a link to it, is added to the statistics data base 54 of the previously dialed number, or its statistics are updated if it was already present as a link. Along with the link, the previous number's statistics preferably also include a counter indicating how many times (or times per time period) the newly dialed number has followed dialing of the previous number, when the previously dialed number led to a connection lasting less than the predetermined time.

As one alternative, the processor may perform this step only if the newly dialed number differs from the previous by less than a predetermined amount. This would detect mis-dialed numbers, but not numbers that have been changed to altogether new numbers, for example, because the subscriber has moved. This may be advantageous, however, since it would force the user to note the completely new number; in this case, the invention would function primarily to correct actual dialing errors rather than to create an up-to-date, automatic phone list.

One complication that may arise is a busy signal. A current call may last less than the predetermined threshold period, yet still have been dialed correctly. Furthermore, the user may re-dial the same number in less than the post-call waiting period even though there still has been no dialing error. The data bases 52, 54 should preferably not be changed because of busy signals, since such signals do not indicate anything concerning whether a number has been correctly dialed.

One way to identify a busy signal is simply to sense the signals already provided by the network for this purpose, and to do so in any conventional manner. Such signals are more or less universal, at least on telephone lines, so there will be little chance of system error when it comes to recognizing a busy line. When a busy signal is sensed, the processor 30 simply halts further analysis of the number, such as timing it or the period after the user ends the call.

Although more accurate in identifying a busy signal unambiguously, this method relies on interpreting signals from outside the local system. Because of the universality of the busy signal as opposed to voice error messages, this will be acceptable in most applications. As an alternative, however, the system according to the invention may also include a busy signal identification routine, which is independent of all network signals. In this alternative embodiment, the processor times the current call in the normal manner. If the user ends the call in less than the predetermined minimum assumed correct call time, and then redials either the same number or a sufficiently "dissimilar" number within the post-call waiting period, then the processor may ignore the statistics generated by the earlier call.

It is also possible that very short calls are "correct." For example, a user may need to leave only a very short voice or numerical message. In order not to misinterpret such calls, the processor 30 may also monitor, by means of any conventional circuitry, the output of the devices 10, 90 during the predetermined assumed correct call time. If the user or other system device speaks or sends data or other signals for more than a predetermined percentage of the time the call is active (connected to the network), then the processor may assume that the call was, in fact, dialed correctly.

In order to make these general descriptions more concrete, consider the following examples. Assume, for example, that the user dials 425-885-4326 thirty times a week, and the average connection time after dialing this number is 90 seconds. Assume, however, that the user also dials 885-4326

(without the "area code") three times a week, but the average time for these calls is less than 15 seconds—long enough to hear an error message. Similarity here is established by the two numbers being identical in the last seven digits but with one lacking the area code 425. The system can thus assume that whenever the user dials 885-4326, she really should have dialed with the area code.

The ability to identify errors can be improved further. As is described generally above, one way is to keep track of the next number called for each stored number, as long as the next call occurs within, say, thirty seconds, and differs by less than some specified number of digits. For example, if, within, say, 30 seconds of dialing 885-4326 and staying on for less than 10 seconds, the user almost always dials 425-885-4326 and stays on for an average of 90 seconds, then it is highly likely that what is happening is that the user is re-dialing a misdialed number. The same procedure would identify wrongly including or excluding the "1" prefix.

The concepts of number "similarity" and "likelihood" can be implemented in any of several ways. The preferred way to measure similarity is to perform a digit-by-digit positional comparison of two numbers, from either the beginning or end, or both. Comparing numbers "backwards" (last digit entered to first) has the advantage that it makes it easier to drop off area codes and access digits such as "1" for USA domestic or "011" for international calls from the USA. For each position in which the numbers' digits differ, for example, a measure of "dissimilarity" could be increased by one; this is a form of a base-ten logical AND operation on of at least the last seven (in the USA) digits. Comparing numbers from both the beginning and end (for example, until a difference is detected) will better enable the system to identify dialing errors in the middle of numbers, for example, a wrongly included digit, such as a "0", that is included as a prefix to the city code of many countries, but that must be dropped when dialing the city from another country.

Adjacent digit errors could be examined to identify transposition errors. If, for example, the two numbers (the one actually dialed and the one found in the data base) differ in two adjacent digits, then the digits of the dialed number could be transposed to check whether they match the stored number—if the stored number has a high calling frequency or a high average call duration, or both, and the dialed number doesn't, or isn't in the data base at all, then it is very likely that the user erroneously transposed the digits. Note that the processor preferably assumes that, of two numbers, the one with the higher calling frequency or higher average call duration, or both, that is, the one that has the lowest likelihood of error, is the number most likely to be correct, especially when the average call duration of the one is much longer (according to any predefined measure) than the other.

In order to avoid assuming transposition when the likelihood of error is similar for the two numbers, some minimum measure of difference should be present before assuming a dialing error. For example, the processor should preferably assume that the initially entered number is wrong only when the measure of likelihood for one number is more than a certain percentage, or absolute amount, or factor, etc., greater than the other. The proper "cut-off" or threshold can be determined experimentally. Such a minimum difference in error likelihood should preferably be included whenever the processor makes a choice between the number actually dialed and any pre-stored number that seems more likely to be correct. It is, after all, possible that a user may dial different numbers that are very similar, especially if the user often calls into a large private network, where all subscribers' numbers are the same except for a final "extension."

The invention requires very little processing time to perform any of the comparison routines. As such, more than one may be implemented, for example, overall similarity scoring based on positional identity may be augmented by a special check for digit transposition if the numbers differ in only two positions.

The measure of likelihood (or, equivalently, error likelihood) may be made a function of time, for example, by storing a moving average (uniformly or nonuniformly weighted as a function of call "age") of the frequency of calls. With such a measure, if, for example, six months ago a user was often calling one particular client but hasn't since then, then the likelihood that that client's number is intended now would be less.

Seldom-dialed numbers dialed more than a certain time in the past could also be deleted specifically from the data base to save memory. To implement this using conventional technology, some dedicated sequence of keys or other commands (including spoken), either hardware or software, should be included in the system to activate this feature. For instance, after each use of the telephone, or according to a predetermined schedule, the processor could check a "last-used" statistic for each number and delete its entry if the indicated date is farther in the past than some predetermined time. The user might also be given the option of scrolling through the numbers in the data base and of deleting those that should never again be considered, or of erasing the data base altogether.

Similar key or command sequences are preferably also implemented, using convention technology, to allow the user to indicate to the system what he wants done when the system identifies an error. Simple commands could switch between: "ignore", "auto-correct," "prompt for decision" and so on. This would be easiest in phones with displays or voice-synthesized prompts.

To avoid automatic error "recognition" before the system "knows" enough, there should preferably be a minimum likelihood level before the system assumes there has been a dialing error. Reliable identification (that is, reliable statistical compilation), of a user's dialing pattern may require, for example, that at least a predetermined number of calls have been made. The number of calls required may be determined by normal experimental methods, for example, by tracking sample test users.

By checking the number as it's being dialed, that is, using serial number processing, the system according to the invention can also automatically recognize frequently dialed numbers before the user is finished dialing them. This implements a "rapid dial" feature that needs no dedicated keys or special key codes. For example, if one dials "1-425-88" then the system could prompt the user with "1-425-885-4326?", with the "appended" digits in some other color or font so they could be "typed" over if the user is dialing some different number.

This would be particularly useful in cell phones—as soon as the system receives a sequence of numbers that either uniquely identifies some number in the data base or corresponds to the beginning n digits (with, say, n>5 to exclude matching on area codes alone) that identifies at least one number in the data base then it appends the remaining digits. If more than one number is "identified," then the system can append the digits of the number with the highest likelihood measure, such as calling frequency. As the user types in additional digits a different number may be identified as the most likely, and so on. When the user accepts the number, he can just press "enter" or "send" as usual, or the system may dial the suggested number automatically if the user pauses more than a predetermined number of seconds. At worst, the user will dial no more digits than he would normally, and he may dial far fewer, with less risk of error.

In essence, the system according to the invention "learns" the frequently dialed numbers of a user by observing and compiling statistics on the user's own dialing patterns. Other secondary features may be included:

Known numbers and facts may be pre-programmed into the memory. For example, the user could be permitted to enter numbers that he knows will be highly probable. The system can then store them in the data base 52 with a permanently high likelihood measure. He could also assign them permanently low (or even zero) likelihood values, indicating that they are frequently made errors.

It would also be possible to pre-store, for example, the main city codes for different countries, along with their country codes, or to store, along with each country code, which, if any, digit of the city codes must be dropped when calling from outside the country. For example, if this is implemented and the user dials 011-46-031-21 34 04 (a number in Göteborg, Sweden), then the system would recognize that the "0" in the city code "031" should not be included and will automatically correct this error before number is submitted to the exchange.

One of the greatest advantages of the invention is that its code identification and correction method can be implemented locally, that is, without requiring additional processing by the remote exchange that ultimately routes the "call" through the network. Everything needed to implement the invention can be incorporated, for example, into the user's telephone or computer. The concept of "localized" intelligence need not, however, be so restricted. Instead, the local system may be any system that submits numbers (or other codes) to the system that is ultimately responsible for routing. For example, a company may have its own private, local exchange that submits to the public network the telephone numbers dialed from many different extensions. The invention could in such case be implemented in the local exchange. This would allow the user to move to different extensions or use different telephones without losing his data bases 52 and 54, as long as some conventional procedure is also implemented to identify the current user.

I claim:

1. A method for generating and submitting access codes to a network comprising the following steps:

compiling and storing in a memory a plurality of stored codes and, for each of the stored codes, a corresponding set of code access statistics;

sensing entry by a user of an initial access code;

comparing the initial access code with the plurality of stored codes;

calculating an error likelihood measure as a predetermined function of the initial access code, the stored codes, and the corresponding set of code access statistics;

when the error likelihood measure is less than a predetermined error threshold, setting the initial access code to be a final access code;

when the error likelihood measure is greater than or equal to a predetermined error threshold, selecting a most likely correct code from among the stored codes and setting the most likely correct code to be the final access code; and accessing and connecting to the network and submitting to it the final access code;

in which:

the stored codes are outgoing codes previously entered by the user;

the step of compiling and storing the plurality of stored codes and corresponding plurality of sets of code access statistics includes the following sub-steps:

upon connecting to the network using the final access code, measuring a total connection time from initial connection to conclusion of the connection;

storing the final access code as one of the stored access codes; and including a predetermined function of the total connection time in the set of code access statistics corresponding to the final access code.

2. A method as defined in claim 1, in which the access and stored codes correspond to positionally ordered sequences of alphanumeric characters and in which the step of calculating the error likelihood measure includes the sub-step of determining a similarity measure between the initial and stored access codes through position-by-position comparison of the characters in the respective codes.

3. A method as defined in claim 2, further including the steps of calculating the error likelihood measure for each stored code and including the corresponding error likelihood measure among the respective sets of code access statistics.

4. A method as defined in claim 3, further including the steps of calculating and including in the error likelihood measure for each stored access code a frequency parameter corresponding to the number of times per predetermined time unit each stored code access sequence has been entered as the initial access code, the error likelihood measure decreasing as the frequency parameter increases.

5. A method as defined in claim 3, further including the following steps:

identifying whether the initial access code is also a stored access code and, if so:

identifying as a potential transposed code any stored access code that differs from the initial access code only by an adjacent pair of characters being transposed relative to a positionally identical pair of characters of the initial access code;

comparing the error likelihood measures of the potential transposed code and the initial access code; and setting as the final access code the one of the potential transposed code and the initial access code that has the lowest error likelihood measure when the error likelihood measures differ by more than a predetermined difference threshold.

6. A method as defined in claim 2, further including the following steps:

separately sensing entry of each character of the initial access code;

comparing each sensed entered character of the initial access code with a positionally corresponding character of each stored access code;

after sensing entry of a predetermined minimum number of characters of the initial access code, and after sensing each subsequently entered character of the initial access code, designating as a most likely complete access code the stored access code having a highest similarity measure relative to the sensed entered characters of the initial access code;

displaying the most likely complete access code to the user; and setting the final access code equal to the most likely complete access code when a user acceptance action is sensed.

7. A system for generating and submitting access codes to a network comprising:
- a memory storing a plurality of stored codes and, for each of the stored codes, a corresponding set of code access statistics;
- code input means for sensing entry of an initial access code;
- network access means for connecting to the network and for submitting a final access code to the network;
- processing means, to which the code input means, network access means, and memory are connected:
  - for comparing the initial access code with the stored codes;
  - for calculating an error likelihood measure as a predetermined function of the initial access code, the stored codes, and the corresponding set of code access statistics;
  - for selecting a most likely correct code from among the stored codes when the error likelihood measure is greater than a predetermined error threshold;
  - for generating the final access code as the most likely correct code and for transferring the final access code to the network access means for initiation of contact with the network using the final access code; and
  - for storing the final access code as one of the stored access codes;
- timing means for measuring a total connection time from initial connection to conclusion of the connection upon connecting to the network using the final access code;
- the processing means being further provided for calculating and including a predetermined function of the total connection time in the set of code access statistics corresponding to the final access code.

8. A system as defined in claim 7, in which the initial access and stored codes correspond to positionally ordered sequences of alphanumeric characters and in the processing mean is further provided for:
- position-by-position comparison of the characters in the respective initial and stored access codes; and
- calculating the error likelihood measure as a predetermined function of the position-by-position comparison.

9. A method as defined in claim 8, further comprising a display, and in which:
- the code input means is user-operable for separate entry and generation of each character of the initial access code; and
- the processing means is further provided
  - for comparing each sensed entered character of the initial access code with a positionally corresponding character of each stored access code;
  - after sensing entry of a predetermined minimum number of characters of the initial access code, and after sensing each subsequently entered character of the initial access code, for designating as a most likely complete access code the stored access code having a highest similarity measure relative to the sensed entered characters of the initial access code;
  - setting the final access code equal to the most likely complete access code when a user acceptance action is sensed; and
- the display displaying each most likely complete access code and the final access code to the user.

10. A system as defined in claim 7, in which the memory and processing means comprise circuit portions of a telephone, the code input means is a telephone keypad, and the initial and stored access codes are telephone numbers.

11. A system as defined in claim 10, in which the telephone is a mobile telephone.

12. A method for generating and submitting access codes to a network comprising the following steps:
- compiling and storing in a memory a plurality of stored codes and a corresponding plurality of sets of code access statistics;
- sensing entry of an initial access code;
- comparing the initial access code with the plurality of stored codes;
- calculating an error likelihood measure as a predetermined function of the initial access code, the stored codes, and the corresponding sets of code access statistics;
- when the error likelihood measure is less than a predetermined error threshold, setting the initial access code to be a final access code;
- when the error likelihood measure is greater than or equal to a predetermined error threshold, selecting a most likely correct code from among the stored codes and setting the most likely correct code to be the final access code;
- accessing and connecting to the network and submitting to it the final access code;
- in which the step of compiling and storing the plurality of stored codes and corresponding plurality of sets of code access statistics includes the following sub-steps:
  - upon connecting to the network using the final access code, measuring a total connection time from initial connection to conclusion of the connection;
  - storing the final access code as one of the stored access codes;
  - including a predetermined function of the total connection time in the set of code access statistics corresponding to the final access code;
  - calculating and storing an average connection time for each stored access code;
  - for each final access code with an average connection time less than a predetermined minimum connection time, determining a post-connection waiting time until a subsequent connection is initiated by the user using a subsequent access code; and
  - when the post-connection waiting time is less than a predetermined minimum waiting period, including the subsequent access code in the code access statistics corresponding to the final access code.

13. A method as defined in claim 7, in which the subsequent access code is included in the code access statistics corresponding to the final access code only when the final and subsequent access codes differ by less than a predetermined similarity measure.

14. A method for generating and submitting access codes to a network comprising the following steps:
- compiling and storing in a memory a plurality of stored codes and a corresponding plurality of sets of code access statistics;
- sensing entry of an initial access code, the access and stored codes corresponding to positionally ordered sequences of alphanumeric characters;
- comparing the initial access code with the plurality of stored codes;
- for each stored code:
  - calculating an error likelihood measure as a predetermined function of the initial access code, the stored codes, and the corresponding sets of code access statistics, including determining a similarity measure between the initial and stored access codes through position-by-position comparison of the characters in the respective codes, and including the corresponding error likelihood measure among the respective sets of code access statistics;

when the error likelihood measure is less than a predetermined error threshold, setting the initial access code to be a final access code;

when the error likelihood measure is greater than or equal to a predetermined error threshold, selecting a most likely correct code from among the stored codes and setting the most likely correct code to be the final access code;

accessing and connecting to the network and submitting to it the final access code;

upon connecting to the network using the final access code, measuring a total connection time from initial connection to conclusion of the connection; and calculating and including in the error likelihood measure for each stored access code an average connection time corresponding to an average of the total connection times measured when the respective stored access code has been submitted as the final access code, the error likelihood measure decreasing as the average connection time increases.

15. A method for generating and submitting access codes to a network comprising the following steps:

or compiling and storing in a memory a plurality of stored codes and, for each of the stored codes, a corresponding set of code access statistics;

sensing entry of an initial access code;

comparing the initial access code with the plurality of stored codes;

calculating an error likelihood measure as a predetermined function of the initial access code, the stored codes, and the corresponding sets of code access statistics;

when the error likelihood measure is less than a predetermined error threshold, setting the initial access code to be a final access code;

when the error likelihood measure is greater than or equal to a predetermined error threshold, selecting a most likely correct code from among the stored codes and setting the most likely correct code to be the final access code;

calculating the error likelihood measure for each stored code and including the corresponding error likelihood measure among the respective set of code access statistics; and accessing and connecting to the network and submitting to it the final access code;

in which the error likelihood measure for each stored access code includes a frequency parameter corresponding to the number of times per predetermined time unit each stored code access sequence has been entered as the initial access code, the error likelihood measure decreasing as the frequency parameter increases, and in which a predetermined function of a total connection time is included in the set of code access statistics corresponding to the final access code, said total connection time being measured from initial connection to the network to a conclusion of the connection.

* * * * *